United States Patent [19]

Hyll

[11] Patent Number: 4,998,706
[45] Date of Patent: * Mar. 12, 1991

[54] VANE CORE ASSEMBLY FOR USE IN MAKING CENTRIFUGAL ELASTOMER COATED IMPELLERS

[75] Inventor: John Hyll, Salt Lake City, Utah

[73] Assignee: Baker International Corporation, Houston, Tex.

[*] Notice: The portion of the term of this patent subsequent to Nov. 17, 2004 has been disclaimed.

[21] Appl. No.: 170,856

[22] Filed: Mar. 21, 1988

Related U.S. Application Data

[60] Continuation of Ser. No. 845,976, Mar. 31, 1986, Pat. No. 4,732,541, which is a division of Ser. No. 743,067, Jun. 10, 1985, Pat. No. 4,706,928.

[51] Int. Cl.$^5$ .............................................. B29C 33/48
[52] U.S. Cl. ........................................ 249/184; 249/64; 249/145; 249/176; 425/577; 425/438; 425/DIG. 58
[58] Field of Search .................. 249/56, 59, 63, 64, 249/142, 151, 145, 152, 176, 184, 66.1; 425/577, DIG. 58, 182, 437, 438; 164/340–342; 29/23.5, 156.8 R, 156.8 CF, 156.8 B, 156.8 P; 416/185, 186 R, 241 A

[56] References Cited

U.S. PATENT DOCUMENTS

| 806,783 | 12/1905 | Dayton | 425/577 |
|---|---|---|---|
| 1,449,097 | 3/1923 | Guyot | 249/184 |
| 2,120,277 | 6/1938 | Grierson | 29/156.8 CF |
| 2,975,481 | 3/1961 | Kauffman | 249/66.1 |
| 2,991,004 | 7/1961 | Denbo et al. | 29/156.8 CF |
| 3,189,671 | 6/1965 | Babb | 264/278 |
| 3,700,372 | 10/1972 | Lalley | 425/577 |
| 3,741,849 | 6/1973 | Hardy | 249/176 |
| 3,756,553 | 9/1973 | Ranz | 249/184 |
| 3,779,688 | 12/1973 | Jullien-Davin | 249/184 |
| 4,101,256 | 7/1978 | White et al. | 249/184 |
| 4,706,928 | 11/1987 | Hyll | 249/184 |
| 4,732,541 | 3/1988 | Hyll | 416/186 R |

Primary Examiner—James C. Housel
Attorney, Agent, or Firm—Trask, Britt & Rossa

[57] ABSTRACT

An elastomeric-covered shrouded impeller having a pair of disk-like shrouds enclosing vanes and vane passages which has an improved throat opening having sweeping internal sidewalls is disclosed. A three-piece mold core is utilized to form the vane passage and the sweeping curved throat inlet of the impeller.

7 Claims, 4 Drawing Sheets

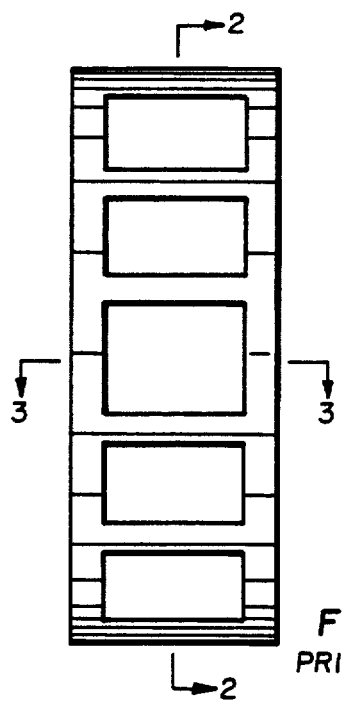
Fig. 1
PRIOR ART
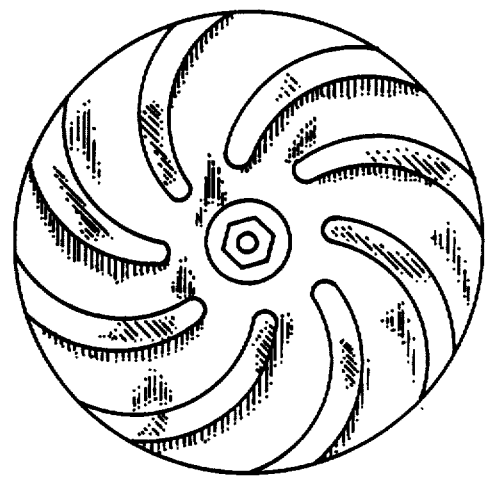
Fig. 2
PRIOR ART
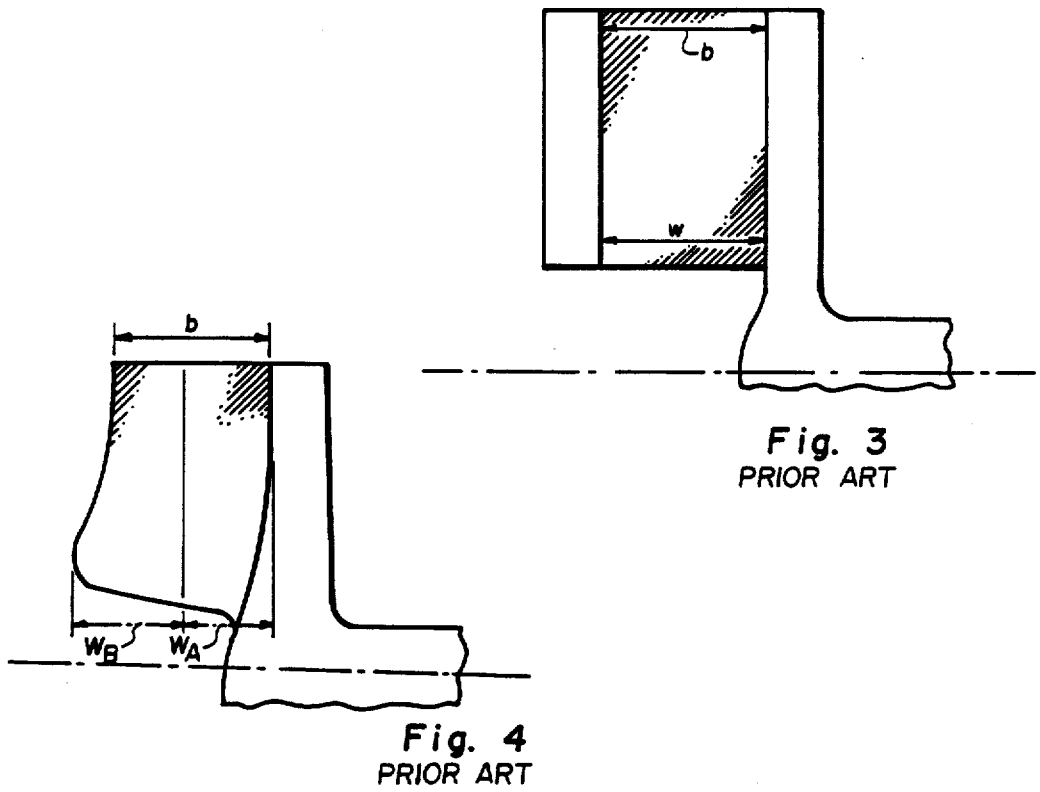
Fig. 3
PRIOR ART
Fig. 4
PRIOR ART

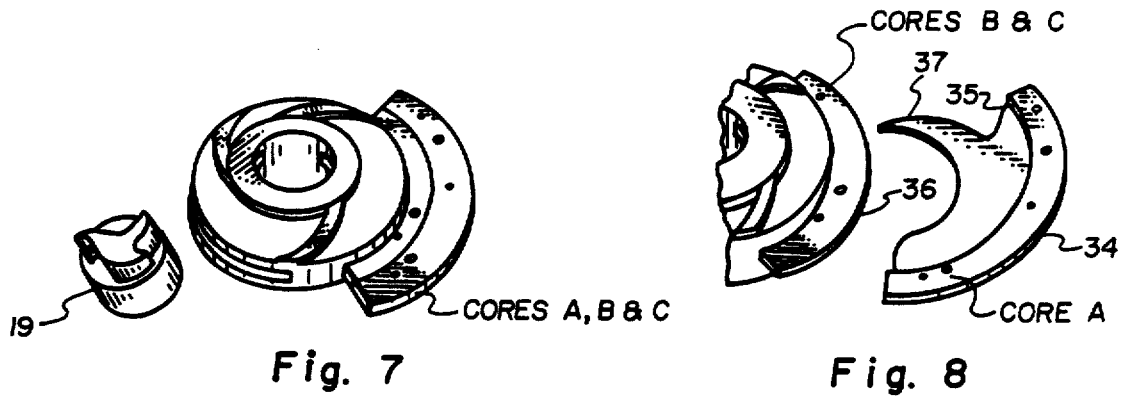
Fig. 7
Fig. 8
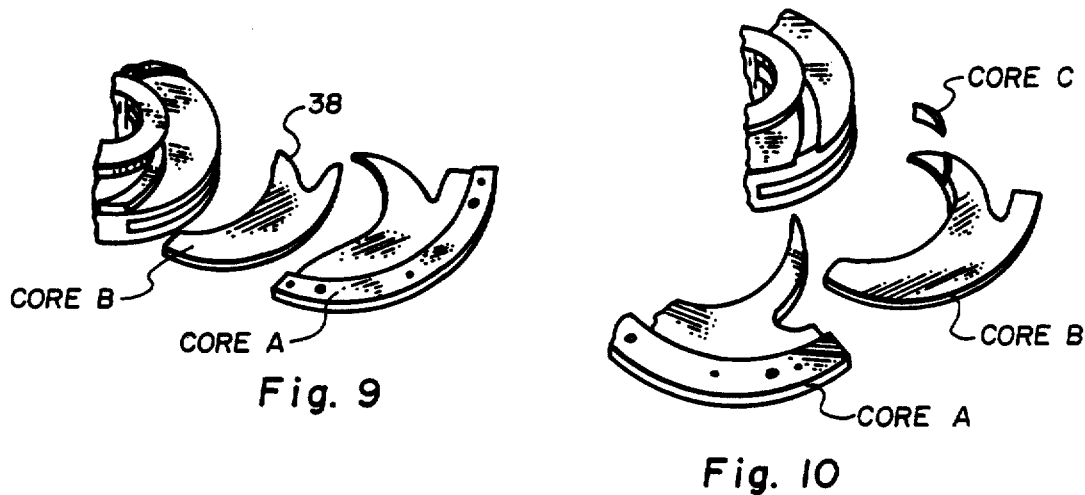
Fig. 9
Fig. 10
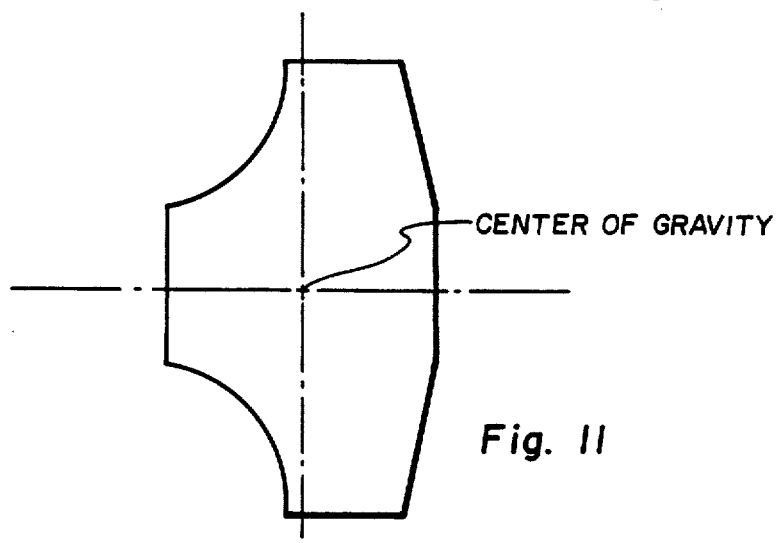
Fig. 11

4,998,706

VANE CORE ASSEMBLY FOR USE IN MAKING CENTRIFUGAL ELASTOMER COATED IMPELLERS

This application is a continuation application of Ser. No. 845,976, filed Mar. 31, 1986, now issued as U.S. Pat. No. 4,732,541, which was a divisional application of Ser. No. 743,067 filed June 10, 1985, and now issued as U.S. Pat. No. 4,706,928.

BACKGROUND OF INVENTION

1. Field

The instant invention relates to elastomeric-covered shrouded impellers for centrifugal pumps.

2. Prior Art

Shrouded impellers in which the vanes and vane passages are enclosed between a pair of opposed shrouds or disks are relatively commonplace in centrifugal pumps. Shrouded impellers are available in both metal and elastomer-covered metal constructions. Metal impellers are typically utilized in non-abrasive, non-corrosive environments. Elastomer-covered impellers, because of expense and difficulty in making same, are typically utilized only where abrasive or corrosive resistance is required, for example, in slurry pumps handling abrasive or gritty solids in a liquid media or in dealing with corrosive liquids such as acids and the like.

An elastomeric-covered impeller is formed about a metal insert. The technique involves placing the metal insert within a mold and providing core elements which provide for the voids within the impeller after molding. Elastomeric material is forced generally under pressure into the molds so that those spaces which exist between the metal insert and the core elements are filled with rubber thereby forming the elastomeric-covered shrouded impeller.

A typical rubber-covered impeller is shown in FIG. 1 in an elevational view showing the peripheral edge of the impeller with vane passage openings shown at the periphery. The formation of the throat opening and vane passages in the molding process is relatively straightforward in this type of construction.

An elevational view of the vanes of a shrouded impeller along section lines 2—2 of FIG. 1 is illustrated in FIG. 2. The spacing between adjacent vanes is closer near the center of the impeller than around the outer edges of the vanes. In the orientation of the impeller illustrated in FIG. 2, the rotation of the impeller is counter-clockwise.

In the arrangement illustrated in FIG. 3, the vane core, which is a portion of the mold which forms the vane passage, has a uniform width "w" between the inner walls of the front and rear shroud. For the purposes of description herein of shrouded impellers, the front shroud is the shroud containing the inlet opening in the throat of the impeller. Thus, the vane core may be easily extracted by a force perpendicular to the central axis of the impeller.

A slight variation to the arrangement illustrated in FIG. 3 is that illustrated in FIG. 4 which is another prior art arrangement. The illustration of FIG. 4 shows some curvature of the inner walls of the front and rear shrouds. This wall curvature is to provide a flow channel from the inlet throat of the impeller into the vane passage which provides a gradual change of direction to accomplish the 90° change of direction from axial inlet flow to radial outlet flow. The vane passage of the impeller of FIG. 4 is formed by a pair of vane core members, A and B whereby, the width $W_A$ and width $W_B$ of each core member is smaller than the width "b" of the peripheral vane passage width. Extraction of these core members is perpendicular to the central axis of the impeller and is in the order of core "A" being first removed and then core "B" being later removed.

In metal impellers with enclosed vanes the formation of shrouds with curved inner walls has been practiced for quite some time. Metal impellers are generally formed by sand casting, whereby the formation of curved interior walls of the forward and rear shrouds has been easily achieved since solid core members are not used in the casting process. Thus, the achievement of a channel connecting the inlet throat with the vane passage in a manner such that the channel encounters no sharp angle restrictions has been long practiced with metal impellers.

The presence of a right-angle corner such as that present in the construction illustrated in FIG. 3 may cause velocity loss as well as turbulence near the square corner and cause erosion of the elastomeric covering on the back shroud in the area directly opposite to the square corner on the front shroud.

SUMMARY OF THE INVENTION

A unique elastomer-covered shrouded impeller having a pair of disk-like shrouds enclosing vanes and vane passages with an improved throat opening has been invented. The throat opening into a particular vane passage is formed between a front disk-like shroud which has a sweeping internal sidewall and a rear disk-like shroud having a conical projection at its center to form a curved channel which interconnects the inlet opening of the impeller with each vane passage so as to introduce axial inlet flow into the right angle peripheral flow in the vane passages with a minimum eddying effect.

The invention further involves a vane core mold assembly comprising at least three vane core members to form a vane passage which has a non-uniform width between the interior walls of the front and rear shrouds and particularly where the width adjacent the inlet portion of the impeller is substantially greater, often about twice as great or more, than the width of the vane passage opening at its peripheral edge between the front and rear shrouds. The vane passage also has a non-uniform spacing between adjacent vanes whereby the opening at the peripheral edge of the impeller is significantly greater between adjacent vanes than the opening between adjacent vanes near the inlet.

Thus, in the instant invention the vane passage is a very irregular void, having a lateral width near the center of the impeller which is much greater than the lateral width (lateral width being the perpendicular distance between the front and rear shrouds) near the periphery of the shrouds while the circumferential spacing between adjacent vanes is exactly the opposite, with the greater distance between adjacent vanes occurring at the periphery of the shrouds and a narrower spacing between adjacent vanes occurring near the center of the impeller.

To accommodate the irregular three-dimensional vane passage, the vane core elements are structured to be removed along an extraction surface between adjacent cores perpendicular to and away from the central axis of the impeller. The core elements are flat members which are curved along opposed edges to conform (and to form) the curved vanes. The curvatures along opposed surfaces of adjacent vanes which form a vane passage are mating surfaces so that the vane core members, as illustrated hereinafter, may be removed along an extraction path, as viewed from the face of the impeller, which is an arc. Generally, two of the vane core elements extend substantially the whole distance from the periphery of the vane passage to the inlet portion of the vane passage. Generally, the third vane core element does not extend the full radial distance of the vane passage.

BRIEF DESCRIPTION OF DRAWINGS

FIG. 1 is an elevational view of the peripheral exterior of a conventional elastomeric-covered impeller.

FIG. 2 is a cross-sectional view of the impeller of FIG. 1 along section lines 2—2 illustrated the curved vanes and vane passages.

FIG. 3 is a cross-sectional view of the impeller of FIG. 1, along section lines 3—3 illustrating the flow channel from the inlet throat to the vane passage.

FIG. 4 is a cross-sectional view similar to FIG. 3 of an impeller having slightly curved shroud walls to provide an improved flow channel from the inlet throat to the vane passage.

FIGS. 7, 8, 9 and 10 are perspective views of an impeller of the instant invention with vane core members illustrated in sequential steps of removal.

FIG. 11 is an elevational view of the peripheral surface of an elastomer-covered impeller of the instant invention.

DETAILED DESCRIPTION OF THE PREFERRED EMBODIMENT

The instant invention involves a unique construction of shrouded, elastomer-covered impellers. Such impellers come in particularly small sizes, for example, less than about 12 inches in diameter, and are provided with a channel comprising the inlet throat and the vane passage which is essentially curvilinear. Fluid entering the pump enters axially through an opening in the front shroud and, through the centrifugal action of the pump, parts in a direction perpendicular to the original axial flow. The change of direction for fluids in the instant impellers is very gradual and distinctly different from that in existing elastomeric-covered, enclosed impellers.

Theoretically, the curvature of the flow channel formed by the throat (inlet opening) through the vane passage to the peripheral exit for the impeller would ideally be a 90° arc of a circle. Such a construction would, of course, involve an impeller axial depth which was greater than about one-half the impeller diameter. While casting of metal impellers approximating such a construction in sacrifical molds is relatively straightforward, making a comparable elastomeric-covered shrouded impeller encounters molding complexities.

In the instant invention, a mold assembly involving a central core member and a vane core mold assembly of at least three elements is utilized to approximate an ideal flow channel from inlet to discharge for an elastomeric-covered shrouded impeller for a centrifugal pump.

The technique for making the impellers of this invention and the multiple-element, vane core mold assembly for forming the sweeping channel connecting the throat and vane passage is unique. Further description of the instant invention may be facilitated by reference to the attached drawings.

Figure 5:
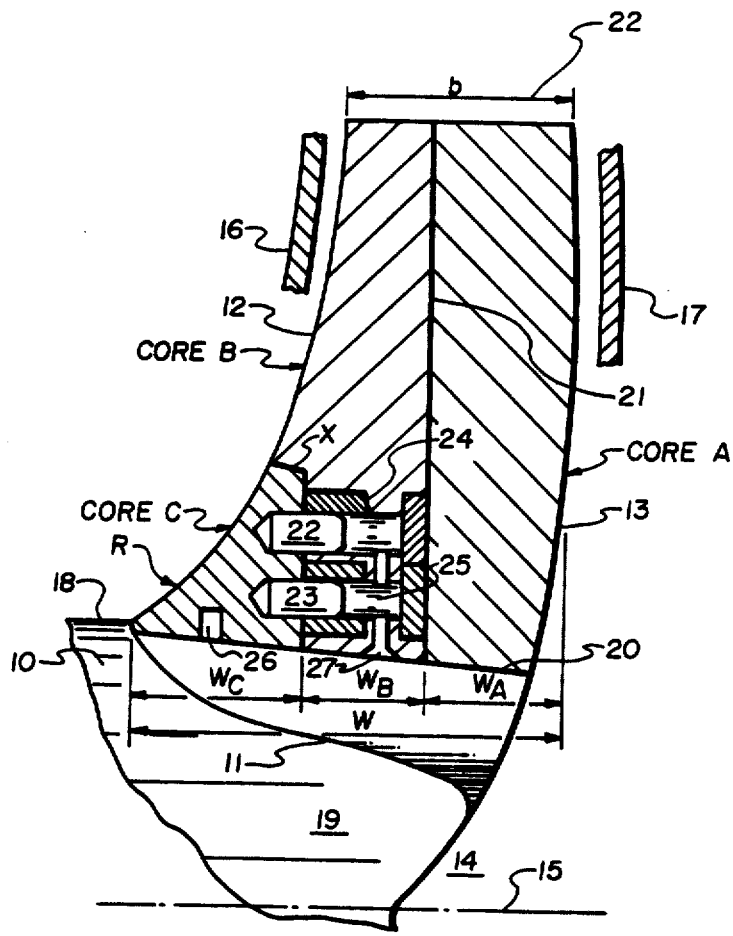
FIG. 5 is a cross-sectional view similar to FIG. 3 of an impeller of the instant invention having radially curved shroud walls forming the vane passage and a cross-sectional view of the core assembly used to form the vane passage.

The unique channel arrangement associated with the instant invention is illustrated in FIG. 5. The throat inlet 10 connects to the vane passage, which in FIG. 5 is occupied by vane core mold members used in molding the appropriately shaped vane passage. As illustrated in FIG. 5, a very gradual change of direction occurs between fluid entering the throat and then changing directions at 90° to exit the vane core passage at the peripheral edge of the impeller.

The vane core passage 11 is formed between the front shroud interior wall 12 and the interior wall of the rear shroud 13. The curved surface of the rear shroud 13 continues below the vane core passage 11 to form a cone-shaped projection 14 with its apex at the central axis of the impeller 15. A steel impeller skeleton is first placed in the mold before rubber is injected. In FIG. 5, the steel skeleton shroud members 16 and 17, respectively, form the front and rear shroud inserts about which the elastomer forms to form the elastomer-covered impeller shrouds.

The interior wall of the front shroud adjacent to the throat inlet has a curvature as established by radius R. Radius R is generally determined by the diameter of the impeller and the amount of sweep desired. Furthermore, the curvature of the interior wall of the front shroud may be described by several different radii having different focal points.

The juncture of the inner wall 12 of the front shroud with the throat inlet wall 18 approximates a curvilinear relationship, that is the curvature of the inner shroud wall 12 is such that the throat inlet wall 18 is substantially tangential to the curved wall 12 at the point of juncture.

The interior wall 13 of the rear shroud has a curvature such that at the apex of the cone 14 the curvature of the cone wall is such that an extension of such curved wall joins with the central axis 15 of the impeller in a curvilinear fashion, that is, the axis is substantially tangential to the extended curve of the curved wall of cone 14.

The center core plug 19 is substantially cylindrical in shape at the throat inlet area and has longitudinal grooves circumferentially spaced equidistantly about the plug near the distal end. These grooves accommodate the formation of extensions of the vanes into the inlet throat and are dished on the end to form the conical projection 14. The center core plug mates with vane core elements A B and C at boundary or parting surface 20. Vane core member A joins at parting line 21 with vane core member B. Parting line 21 is, in fact, a planar surface as illustrated in other drawings, and is substantially perpendicular to the central axis 15. Vane core member "A" has a maximum width $W_A$, which must not be greater than its width at the exit of the vane passage. Since the extraction of the core is in a direction perpendicular to the central axis 15 no thickness of any core member can exceed the width of the core member at its exit point. The width of $W_A$ must, of course, be less than the width of the exit as illustrated by letter "b". Preferably, the width $W_A$ is significantly less than the exit width "b". The second vane core member B should have a sufficient thickness near its exit to be sufficiently durable that it is not easily broken. For example, if core member A were substantially as thick as exit width b then core member B may be substantially a knife edge at its upper portions and, therefore, would be easily broken.

In the core mold arrangement illustrated in FIG. 5, the width of W, which is the combined widths of core members A, B and C, is greater than the exit width "b". In the case of core member B the width $W_B$ is not the maximum width of the element, however, the maximum width of core member B, which is near shoulder "X", must be smaller than the exit width "b". Core members B and C are formed with a shoulder "X" so that again a silver or knife edge is not required on core member C. Structuring core member C such that it is recessed slightly into core member B makes core member C an easier part to fabricate and assures a better seal at the sealing surfaces between core members so that the mold surface presented to form interior wall 12 is a continuous surface. Core member C and core member B are joined together by pins projecting from core member C which are recessed within bores in core member B. Conversely, the pins could be affixed to core member B and the bores recessed within core member C. Since the surfaces at the joint between core members B and C are generally machined surfaces the parts may tend to stick together after being subjected to the pressures within the mold during injection of the elastomeric rubber material. A pry slot 26 is provided for insertion of a screw driver or the like, to pry the cores B and C apart. Also air injection port 27 is provided in core member B so that air pressure may be introduced into bores 24 and 25 to eject pins 22 and 23 to separate cores C and B. Pry slot 26 and air injection port 27 are at a boundary surface between cores B and C and the center core plug so that the elastomer in liquid form, as it is filling the mold, cannot reach the slot 26 or port 27, so that these remain open and unfilled with rubber.

Figure 6:
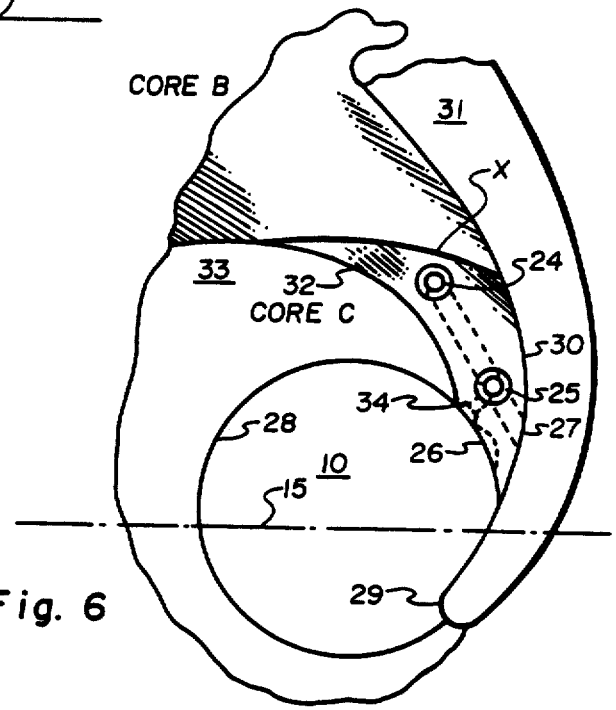
FIG. 6 is an elevational view of the vane core assembly member of the instant invention.

A frontal or elevational view of core member C is illustrated in FIG. 6. Core C has a substantially crescent shape; the central circle 28 illustrating the cylindrical wall of throat 10. FIG. 6 illustrates the central core plug 19 positioned in place with grooves 29 in the distal cylindrical surface of the plug spaced so as to form the interior tips of the vanes which protrude into the throat region. Thus, core member C at surface 30 forms a portion of the surface of a vane 31 while the surface 32 of the core C forms a surface of a vane 33. The juncture line "X" is illustrated showing a juncture surface between core B and core C. Surface 34 is the parting surface formed between core C and the central core plug 19. Pry slot 26 is shown in dotted lines as is injection port 27 which interconnects bores 24 and 25.

FIGS. 7, 8, 9 and 10 illustrate sequentially the removal of vane core members A, B and C and central core plug 19.

FIG. 7, is a perspective view of an elastomeric-coated impeller which has been molded and which has had the center core plug 19 removed. Also, two of the vane passage core subassemblies have been removed. In molding a complete impeller with three vanes, and three vane passages, three vane core subassemblies similar to the subassembly shown in FIGS. 7 through 10 are utilized so that three vanes are formed and three vane core passages are formed in the impeller. In FIG. 7, cores A, B and C are still positioned within the impeller. In FIG. 8, vane core A has been removed. Core A has a rim 34, which is substantially as thick at its outer edge as the vane passage of the impeller. A quarter-circle arc-like shoulder 35 is formed in the rim 34, said shoulder having a thickness substantially the same as the thickness of the rim 36 of vane core "B". Thus, vane core "A" and vane core "B" mate in concentric fashion as well as in a planar fashion where the tongue 37 of vane core A extends into the vane core passage.

In FIG. 9, vane core B is shown after it has been removed from the impeller. Vane core B has an outer rim 36 which is a third of a circle in its arc and mates with the third of a circle shoulder 35 of vane core A. Vane core "B" has a tongue 38, which extends into the vane core passage. The edge surfaces of tongues 37 and 38 are illustrated in FIG. 5 and the tongues have a width, $W_A$ and $W_B$, as indicated in FIG. 5.

FIG. 10 shows vane core C removed from the impeller. The substantially crescent-shaped vane core C is illustrated.

It is apparent from FIGS. 7 through 10, that similar vane core elements could be utilized to form any number of vane passages and vanes in an enclosed shrouded impeller. For example, an impeller could be formed having three, five, six, or any number of vanes and vane passages in which the rim portions of the cores A and B, respectively, would be one-third, one-fifth and one-sixth of a complete circle.

Figure 12:
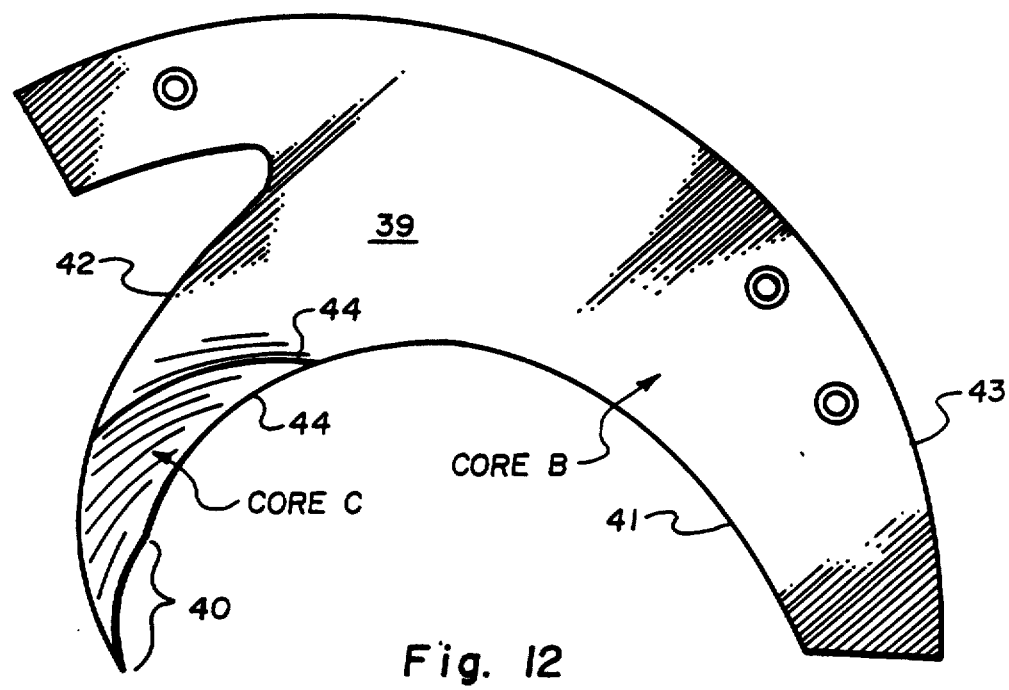
FIG. 12 is an elevational, facial view of a vane core element of the instant invention.

A facial view of core elements B and C is presented in FIG. 12. Core B and core A substantially have the same overall shape, i.e. core B may set in with core A. The flat, planar surfaces of core A are parallel to one another while core B has one flat planar surface which mates with a flat planar surface of core A. The other facial surface is a curved surface such that the width between opposed faces of the tongue increases with distance from the rim. The sweep of surface is such that it continues with the surface of core C.

That edge of core C designated by the numeral 40 is that portion which mates with the cylindrical center plug of the mold. Edge 41 of the tongue of core B forms one surface of a vane while edge 42 forms a surface of an adjacent vane. The space occupied by the tongue of core B and core C between adjacent vanes is a vane passage.

Figure 13:
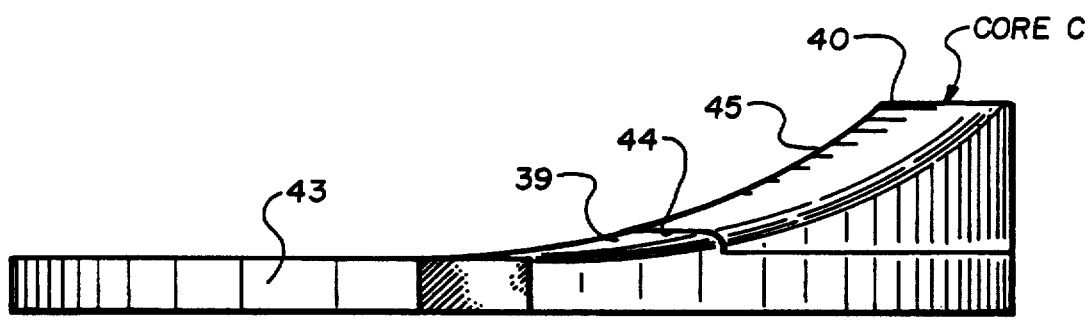
FIG. 13 is a plan view of the peripheral edge of the vane core elements of FIG. 12.

The view in FIG. 13 is an edge-on, rim view of cores B and C illustrated in FIG. 12. The outer edge 43 of the rim has a certain width, which is the width also of the tongue member adjacent the rim. The tongue of core B increases in thickness with distance from the rim, as illustrated in FIG. 13. The joint 44 between core C and core B is at the shoulder joint between these two elements. The affect of the shoulder is about the same as the increase in thickness of the tongue of core B from the rim to the shoulder. Thus, surfaces 40 and 45 are part of core C. The depth of the shoulder 44 and thickness of core B may be viewed in FIG. 5. The thickness of edge 40 at its junction with shoulder 44 is about the same as the thickness of edge 41 at its juncture with shoulder 44. The mating surfaces between cores C and B are flat, planar surfaces which have a substantially crescent-shaped outline.

In FIG. 11 an edge-on elevational view of an impeller of the invention is illustrated. The center of gravity of the impeller is shifted towards the inlet opening. A consequence of the increased width of the impeller and the shift in the center of gravity is to position the center of gravity farther from the external bearing supporting the impeller shaft. Also, because of the greater cantilever effects of the impeller upon the bearing, a larger shaft and bearing are generally required.

Elastomeric impellers of the type of the instant invention for a given diameter impeller will generally weight more, assuming the same thickness of elastomeric covering, than conventional elastomeric prior art impellers. Such increase in weight further would require an increase in shaft and bearing size. Thus, increased shaft and bearing sizes required for construction of this type may have led those skilled in the art away from making impellers of the type of this invention.

It has been found, however, that the elastomer-covered impellers of this invention provide a significant increase in hydraulic efficiency, a significant decrease in power consumption and improved impeller life when compared with prior art-type impellers of similar diameters. Thus, a smaller diameter impeller of the instant invention may be effectively substituted for larger diameter impellers of the prior art type, so that no real increase in shaft size or bearing size actually occurs when determined by pump performance.

Molding of elastomer-covered impellers is done under very high pressures, i.e. injection pressures of 1500 psi. to about 2000 psi, with internal mold pressure spikes of upwards of 5000 psi, to about 6000 psi. Such high pressures require mold elements which are particularly rugged, especially for vane core elements which, in the instant invention, are cantilevered from an external rim member.

Should deflection or displacement of any mold element occur, several adverse conditions may result, such as:

a. the hydraulic passageways may be distorted and less efficient than desired;
b. the thickness of rubber deposited in a particular area may be less than desired, thereby diminishing the wear resistance life of the impeller and
c. the balance and dynamics of the impeller may be adversely affected.

Because of these adverse consequences, the various mold elements must fit securely together and all elements must be sufficiently strong to resist any imbalance in pressure during the molding process.

Elastomer-covered impellers of this invention have pumping efficiencies which are significantly improved over previous configurations of elastomer-covered impellers. For example, small diameter impellers of from about six inches to twelve inches diameter show improvements of about 30% in pump efficiency when compared to other similarly sized pumps with configurations such as those shown in FIGS. 1 and 2.

Another measurement of improvement for the pumps of the instant invention is that power requirements to pump a certain volumetric rate of liquid to a certain head is accomplished with significantly less power consumption.

I claim:

1. A vane core assembly for use in forming a vane passage in an injection-formed, elastomer-covered, closed-shroud impeller, said vane core assembly comprising:

a first core element having a first length sized to extend from a central opening in said impeller to a periphery of said impeller;

a second core element detachably mated with said first core element, said second core element having a second length sized to extend from said central opening of said impeller to said periphery of said impeller; and a third core element detachably mounted to said second core element by a pneumatically operable separation means adapted for detaching said third core element from said second core element, said third core element having a length sized to extend from said central opening of said impeller to a location within said impeller short of said impeller periphery, said third length being dimensionally less than said first length and said second length.

2. The vane core assembly according to claim 1 wherein one of said elements defines a slot therein dimensioned to receive a tool for facilitating a pried separation of said slot-defining core element from a core element positioned adjacent thereto.

3. The vane core assembly of claim 1 wherein said first core element and said second core element each include an outer rim mounted thereon, said outer rims being configured to coact one with another to retain said first core element in stationary relation to said second core element.

4. A vane core assembly for use in forming a vane passage in an injection-formed, elastomer-covered, closed shroud impeller, said vane core assembly comprising:

a first core element, sized to extend from a central opening in said impeller to a periphery of said impeller;

a second core element, detachably mated with said first core element, said second core element being sized to extend from said central opening in said impeller to said periphery of said impeller, and a third core element, detachably mounted on said second core element by a pneumatically operable separation means adapted for detaching said third core element from said second core element, said third core element being detachable from said second core element by manipulation through said central opening.

5. The vane core assembly according to claim 4 wherein said third core element extends a distance less than a distance between said central opening and said periphery.

6. A vane core assembly for forming an arc-shaped vane passage between a pair of adjacent vanes in an injection-formed, elastomer-covered, closed shroud impeller, said impeller having an inlet which communicates with said vane passages, wherein said vane passage has a peripheral arcual opening having a length substantially greater than its central arcual opening length, wherein a width of said central opening of said vane passage is substantially greater than the width of said vane passage's peripheral opening and wherein said central opening is transposed from a center line alignment with said peripheral openings, said vane core comprising a first core element, a second core element, and a third core element, said first core element and said second core element having planar mating surfaces which are substantially coextensive and at least one third core element which detachably mates with a portion of a surface of said second core element which is opposed to said surface of said second core element which is in contact with said first core element; said third core element being adjacent said central opening to said vane passage wherein said first core element and said second core element are dimensioned to extend substantially from said central opening to said peripheral opening within said vane passage; and wherein said third core element is dimensioned to have a length much shorter than a distance between said central opening and said peripheral opening whereby when said vane core assembly is positioned within said vane passage, said third core element, being positioned within said central opening and extending into said vane passage, does not extend sufficiently to reach said peripheral opening; said first core element and said second core element being retractable from said vane passage along an arc-shaped path defined by said vane passage, said third core element being detachably secured to said second core element by an attachment means configured to be accessible from said impeller inlet when said vane core assembly is positioned within said vane passage wherein said attachment means may be accessed and manipulated through said impeller inlet to effect a detachment of said third core element from said second core element while said second and third core elements are within said vane passage prior to a withdrawal of said second vane core element from said vane passage.

7. A vane core assembly for use in forming a vane passage between a pair of adjacent vanes in an injection-formed, elastomer-covered, closed shroud impeller, said vane passage having a central opening proximate an inlet of the impeller, and a peripheral opening proximate a periphery of said impeller, a width of said central opening being at least twice as large as a width of said peripheral opening and a length of said peripheral opening being substantially greater than a length of said central opening; said vane core assembly comprising:

a first vane core element dimensioned to extend substantially from said central opening to said peripheral opening of said vane passage;

a second vane core element detachably mounted on said first vane core element, said second vane core element being dimensioned to extend substantially from said central opening to said peripheral opening of said vane passage;

a third vane core element, detachably mounted by attachment means on a proximal end of said second vane core element; said third vane core element being positionable within said central opening, said third vane core element having a length less than a length of said vane passage, whereby when said vane assembly is positioned within said vane passage said third vane core element extends between said central opening and a location short of said peripheral opening;

wherein said attachment means are configured to be accessible from said impeller inlet when said vane core assembly is within said vane passage whereby said third vane core element is manually detachable from said second vane core element by manipulation of said second and third vane core elements through said impeller inlet while said second and third vane core elements are within said vane passage.

* * * * *

UNITED STATES PATENT AND TRADEMARK OFFICE
CERTIFICATE OF CORRECTION

PATENT NO. : 4,998,706
DATED : March 12, 1991
INVENTOR(S) : John Hyll

It is certified that error appears in the above-indentified patent and that said Letters Patent is hereby corrected as shown below:

In Column 3, line 17, change "illustrated" to --illustrating--;

In Column 3, line 26, change "FIG. 3" to --FIG. 4--;

In Column 5, line 19, change "silver" to --sliver--.

Signed and Sealed this

Fourteenth Day of March, 1995

Attest:

BRUCE LEHMAN

Attesting Officer    Commissioner of Patents and Trademarks